Jan. 3, 1961     W. SCHELKMANN     2,966,936
WORKING METHOD FOR RECAPPING AND REPAIRING TIRES
Filed July 31, 1956     3 Sheets-Sheet 1
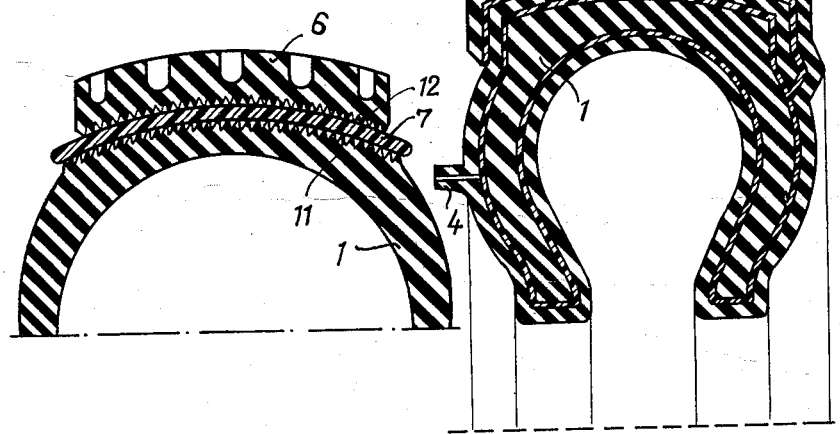
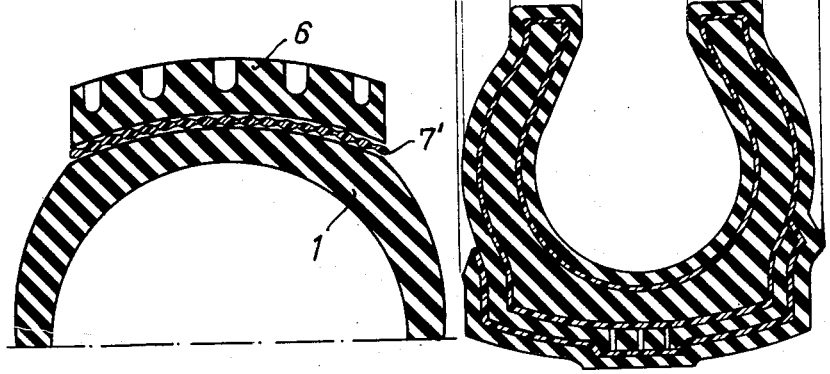
INVENTOR:
Wilhelm Schelkmann
BY: Michael S. Striker
Agt.

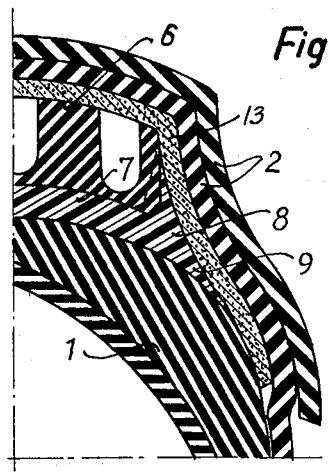
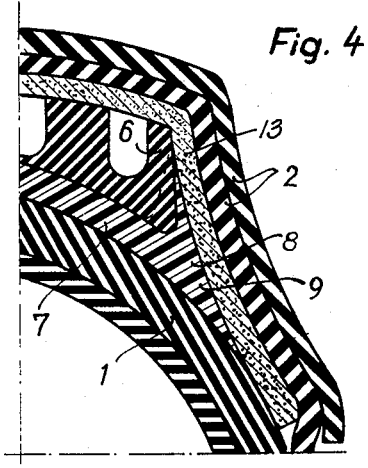
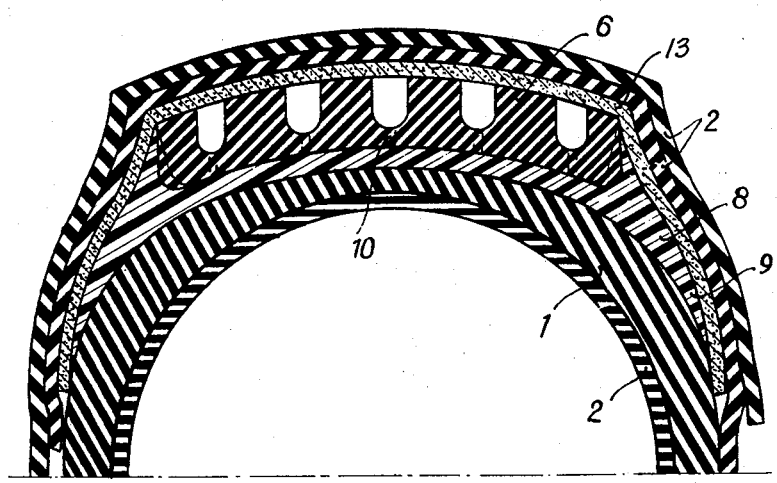

Jan. 3, 1961 W. SCHELKMANN 2,966,936
WORKING METHOD FOR RECAPPING AND REPAIRING TIRES
Filed July 31, 1956 3 Sheets-Sheet 3
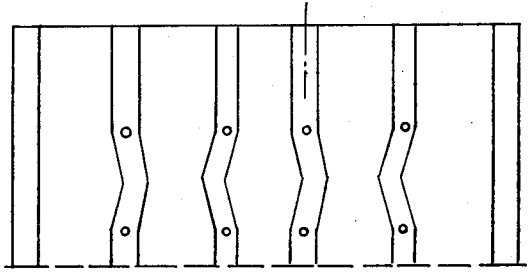
Fig. 5
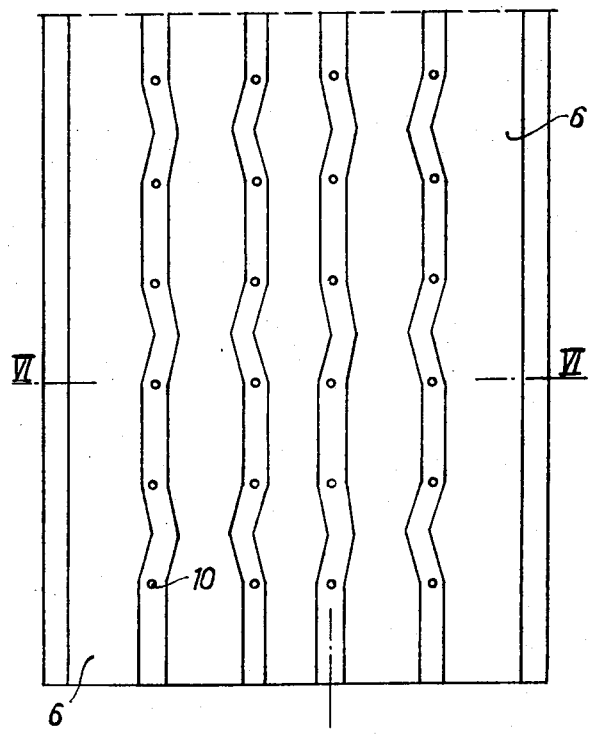
Fig. 6
Fig. 7
INVENTOR:
Wilhelm Schelkmann
BY: *[signature]*
Agt.

United States Patent Office 2,966,936
Patented Jan. 3, 1961

2,966,936

WORKING METHOD FOR RECAPPING AND REPAIRING TIRES

Wilhelm Schelkmann, Crengeldanzstrasse 85, Witten (Ruhr), Germany

Filed July 31, 1956, Ser. No. 601,154

Claims priority, application Netherlands Aug. 4, 1955

6 Claims. (Cl. 154—14)

The invention concerns the recapping and repairing of tires. Normally, worn tires are recapped by the warm vulcanization method in which, an uncured camelback is applied to the cemented buffed carcass, which are then tightly rolled- and stitched down, whereafter the whole is vulcanized in a heated fixed mould. By another method a vulcanized tread is applied, while stretched, to the carcass. When this method is used it is clear that the carcass must be compressed to make it able to press the carcass and tread together.

By the above mentioned methods the carcass is deformed during the vulcanization, which often causes that a decrease of the potential mileage is obtained in the use of the repaired tire.

All these disadvantages are excluded when the new recapping and repairing method of the present invention is used. At the same time the use of fixed moulds, press-platens, rims, airbags, stitch-and roll down machines and cement are superfluous. Also it is for the first time possible, by using the new method to apply a vulcanized tread, which is a few percent longer than the outer circumference of the buffed tire, on the carcass, which together with the choice of a good tread design gives the tire more mileage.

By the new method, a vulcanized tread is applied after the carcass is covered with a layer of a special rubber compound. Then the retreaded tire is brought in an elastic cover which encloses the tire on the inside as well as on the outside whereafter the whole assembly is brought under pressure in a heated vessel. The pressures in the vessel (autoclave), which can be regulated, presses on the whole surface of the elastic cover and thus also on the surface of the tire which has to be repaired. As the vessel is heated, and after that the whole assembly has reached the necessary temperature (which is in a relative short time), the uncured layer of rubber compound flows between carcass and tread, becomes vulcanized and causes permanent adherence of the tread to the carcass.

Air, eventually present between carcass and tread is carried off by way of a valve provided for this purpose on the elastic cover.

By roughening the superimposed surfaces a network of channels may be created along which the air can escape. It is possible to improve the network of channels by applying a profiled layer of rubber compound between carcass and tread or by the use of a tread of special shape.

The elastic cover is of one piece and is supplied with rubber lips by which, after the overlapping parts are brought under vacuum, the cover will be air-tightly closed.

Therefore the pressure which reigns inside the vessel cannot enter the elastic cover, nor between tire and tread, but only work on the outer surface of the assembly. It is this pressure working equally all over the surface, but without causing any deformation, which causes the tight combination of tread and tire.

For the elastic cover such a material is used that the cover encloses the tire and the tread thereon without contacting the side faces of the tread so that empty spaces or gaps are formed laterally of these side faces which are bridged by the cover.

The high pressure causes the material of the unvulcanized layer between carcass and tread, after it has reached the necessary temperature, to flow and to fill the gaps between tire and cover with material, building a V-shaped tight combination. If the elastic cover is formed with appropriate grooves it is possible to form this V-shaped connection with a corresponding profile. The special rubber compound makes the use of cement and the tight stitching- and rolling down of the tread to prevent enclosed or entrapped air, superfluous.

As no deformation occurs during the vulcanization, by which the tread and tire are pressed together, it is impossible that the two parts are shifted with regard to each other. Necessary repairs on the outside or inside of the tire, as well as applications of cord repair patches can be carried out in one operation.

It was up till now impossible to recap tires with damaged sidewalls. By application of the new method, this can be done without any difficulty.

In the figures the several possibilities of the invention are clearly illustrated:

Fig. 1 is a diagrammatic cross section showing a tire enclosed in a flexible cover sheet;

Figs. 2–4 are partial cross sections showing part of a tire, part of a tread superimposed on the outer tire surface and a layer of binding material sandwiched between the tire and the tread, as well as part of the cover enveloping the assembly of tire tread and layer of binding material;

Fig. 5 shows a tread as preferably used in carrying out the present invention;

Fig. 6 is a cross section taken along the line VI—VI of Fig. 5;

Fig. 7 is a cross section taken along the line VII—VII of Fig. 5;

Fig. 8 is a partial cross section through a tire with a tread superimposed and a layer of binding material sandwiched between the tread and the tire and in which the opposite surfaces of tire and tread are roughened; and Fig. 9 shows a partial cross section similar to Fig. 8 in which a specially profiled layer of binding material is used between the tread and the tire.

In carrying out the method for recapping and repairing tires according to the present invention, a tread 6 is superimposed on the worn outer surface of a tire 1 with a layer of binding material 7 sandwiched between the tread and the tire surface. Preferably, the tire and tread are made out of vulcanized rubber, whereas the layer of binding material is made out of unvulcanized rubber compound. The assembly of tire, tread, and layer of binding material is then enclosed into an air-tightly closed cover 2 which is preferably formed from a single sheet of flexible material. As best shown in Fig. 1, this flexible cover is preferably U-shaped and covers the outside as well as the inside of the assembly. The cover is preferably formed with extending lips 3 which overlap each other when the flexible cover is wrapped around the assembly as clearly shown in Fig. 1. After the tire and tread assembly is enclosed in the flexible cover which is tightly wrapped around the assembly, any air remaining within the cover is evacuated therefrom through the valves 4 and 5, schematically shown in Fig. 1. If desired, only a single valve, such as valve 5, can be used for this purpose. To assure that no air is trapped between the tread 6 and the outer surface of the tire 1, the tread is preferably formed with a plurality of holes 10, as best shown in Figures 5–7. It is also possible to roughen the surfaces 11 and 12 of the tire 1 and tread 6 which respectively engage the layer of binding material 7, as shown in Figure 8, so as to form small channels through which any air trapped between the tread 6, the tire 1 and the layer of binding material 7 may escape. Instead of roughening the surfaces of the tread and the tire, a profiled layer of binding material 7' as shown in Fig. 9 may also be used for the purpose of facilitating escape of air between tread and tire. When the air is thus evacuated from the interior of the closed cover sheet, the outer atmosphere's pressure will press the overlapping lips of flaps 3 of the cover sheet closely against each other to provide in this way for an air-tight seal of the cover sheet. After the assembly of tire, tread and layer of binding material is thus air-tightly enclosed in the cover sheet 2, the whole assembly is then subjected to heat and pressure, preferably in an autoclave, so that the layer of binding material 7 of preferably unvulcanized rubber will soften and then become vulcanized to cause permanent adherence of the tread 6 to the tire 1. During the softening of the layer of binding material 7, part of this material may also flow into the V-shaped gap 8 between the lateral edge of the tread 7, the tire 1 and the cover sheet 2 to form thus a V-shaped connection 9 between the lateral edge of the tread and the tire.

An increased roughening of the surface 11 of tire 1 and the surface 12 of tread 6, as shown in Fig. 8, will provide for a better bonding of the layer 7. The layer 7' of special compound (cushion gum) can also be profiled as shown in Fig. 9.

In the Figs. 2 and 4 a special cover 13 is shown, closing gaps between tire 1 and cover 2 and preventing adherence of the rubber compound 7 to the cover 2. For this purpose a part of a tube can be used.

I claim:

1. A method of repairing tires comprising the steps of forming an assembly consisting essentially of a tire having a U-shaped cross-section, a sheet portion of resilient material superimposed upon a surface portion of said tire, and a layer of binding material sandwiched between the tire surface and said sheet portion; enclosing said assembly into an air-tight closed cover being flexible at least in the region of said sheet portion of resilient material, having also a substantially U-shaped cross-section and extending along the entire outer surface of said assembly; evacuating air from the space between said assembly and said air-tight closed cover whereby the vacuum created within the air-tightly closed cover will remove all air enclosures between said tire surface portion, said layer of binding material and said sheet portion of resilient material while the atmospheric pressure acting on the resilient portion of said cover will press the sheet portion of resilient material against said layer of binding material and said surface portion of said tire; and treating the assembly enclosed in said cover to cause said layer of binding material to permanently bond said sheet portion of resilient material to said tire surface portion, and said cover, said sheet of resilient material and said tire being made respectively from materials so that said cover will not adhere to said sheet of resilient material and said tire during this treatment.

2. A method of recapping tires comprising the steps of forming an assembly consisting essentially of a tire, a tread superimposed upon the outer face of said tire, and a layer of binding material between the tire surface and said tread; wrapping a single flexible cover sheet over said assembly so that said cover sheet engages at least the inner and outer faces thereof and so that said cover sheet forms an enclosed wrapper enclosing said assembly; evacuating air from said closed wrapper so that said cover sheet is pressed by atmospheric pressure against the inner and outer faces of said assembly, whereby said tire and said tread are pressed from opposite sides and without clearance against said layer of binding material without deforming the tire while all air enclosures between said superimposed tire, tread and layer of binding material are removed due to the vacuum in the closed wrapper and the atmospheric pressure acting on the outer surface of the same; and treating the assembly enclosed in said closed wrapper to cause said layer of binding material to permanently bond said tread to said tire surface, and said cover sheet, said tread and said tire being made respectively from materials so that said cover sheet will not adhere to said tread and said tire during this treatment.

3. A method of recapping tires comprising the steps of forming an assembly consisting essentially of a tire of vulcanized rubber, a tread of vulcanized rubber superimposed upon the outer face of said tire, and a layer of unvulcanized rubber between the tire surface and said tread; wrapping a single flexible cover sheet over said assembly so that said cover sheet engages at least the inner and outer faces thereof and so that said cover sheet forms an enclosed wrapper enclosing said assembly; evacuating air from said closed wrapper so that said cover sheet is pressed by atmospheric pressure against the inner and outer faces of said assembly, whereby said tire and said tread are pressed from opposite sides and without clearance against said layer of unvulcanized rubber without deforming the tire while all air enclosures between said superimposed tire, tread and layer of unvulcanized rubber are removed due to the vacuum in the closed wrapper and the atmospheric pressure acting on the outer surface of the same; and heating the assembly enclosed in said closed wrapper for a period of time at a temperature sufficient to vulcanize said layer of unvulcanized rubber to cause permanent adherence of said tread to said tire.

4. A method of recapping tires comprising the steps of forming an assembly consisting essentially of a tire, a tread superimposed upon the outer face of said tire, and a layer of binding material between the tire surface and said tread; wrapping a single flexible cover sheet over said assembly with the edges of said cover sheet overlapping each other so that said cover sheet engages at least the inner and outer faces thereof and so that said cover sheet forms an enclosed wrapper enclosing said assembly; evacuating air from said closed wrapper so that said cover sheet is pressed by atmospheric pressure against the inner and outer faces of said assembly and so that said overlapping edges are held in sealed relationship by the vacuum within the enclosed wrapper and the atmospheric pressure acting against the outer surface thereof, whereby said tire and said tread are pressed from opposite sides and without clearance against said layer of binding material without deforming the tire while all air enclosures between said superimposed tire, tread and layer of binding material are removed due to the vacuum in the closed wrapper and the atmospheric pressure acting on the outer surface of the same; and treating the assembly enclosed in said closed wrapper to cause said layer of binding material to permanently bond said tread to said tire surface, and said cover sheet, said tread and said tire being made respectively from materials so that said cover sheet will not adhere to said tread and said tire during this treatment.

5. A method of recapping tires comprising the steps of forming an assembly consisting essentially of a tire, a tread superimposed upon the outer face of said tire, and a layer of binding material between the tire surface and said tread, said tread being formed with a plurality of perforations passing transversely therethrough to said layer of binding material; wrapping a single flexible cover sheet over said assembly so that said cover sheet engages at least the inner and outer faces thereof and so that said cover sheet forms an enclosed wrapper enclosing said assembly; evacuating air from said closed wrapper so that said cover sheet is pressed by atmospheric pressure against the inner and outer faces of said assembly, whereby said tire and said tread are pressed from opposite sides and without clearance against said layer of binding material without deforming the tire while all air enclosures between said superimposed tire, tread and layer of binding material are removed due to the vacuum in the closed wrapper and the atmospheric pressure acting on the outer surface of the same; and treating the assembly enclosed in said closed wrapper to cause said layer of binding material to permanently bond said tread to said tire surface, and said cover sheet, said tread and said tire being made respectively from materials so that said cover sheet will not adhere to said tread and said tire during this treatment.

6. A method of recapping tires comprising the steps of forming an assembly consisting essentially of a tire of vulcanized rubber, a tread of vulcanized rubber superimposed upon the outer face of said tire, and a layer of unvulcanized rubber between the tire surface and said tread, with the side faces of said tread extending substantially normal to the outer face of said tire; wrapping a single flexible cover sheet over said assembly so that said cover sheet engages the inner and outer faces thereof without engaging said side faces of said tread and so that said cover sheet forms an enclosed wrapper enclosing said assembly while empty spaces are formed between said side faces of said tread and the inner surface of said cover sheet; evacuating air from said closed wrapper so that said cover sheet is pressed by atmospheric pressure against the inner and outer faces of said assembly, whereby said tire and said tread are pressed from opposite sides and without clearance against said layer of unvulcanized rubber without deforming the tire while all air enclosures between said superimposed tire, tread and layer of unvulcanized rubber are removed due to the vacuum in the closed wrapper and the atmospheric pressure acting on the outer surface of the same; and heating the assembly enclosed in said closed wrapper for a period of time at a temperature sufficient to vulcanize said layer of unvulcanized rubber to cause permanent adherence of said tread to said tire and to cause a portion of said unvulcanized rubber to flow into said empty spaces to form a wedge-shaped connection between the side faces of said tread and the adjacent surface portions of said tire.

References Cited in the file of this patent

UNITED STATES PATENTS

| | | |
|---|---|---|
| 1,216,654 | Burke | Feb. 20, 1917 |
| 1,335,124 | Midgley | Mar. 30, 1920 |
| 1,374,805 | Ballou | Apr. 12, 1921 |
| 1,509,301 | Kearns | Sept. 23, 1924 |
| 1,579,641 | Burdette | Apr. 6, 1926 |
| 1,592,536 | O'Neill | July 13, 1926 |
| 1,609,510 | Eno | Dec. 7, 1926 |
| 1,652,726 | Mook | Dec. 13, 1927 |
| 1,690,615 | Burke | Nov. 6, 1928 |
| 2,292,286 | Owen | Aug. 4, 1942 |
| 2,441,097 | Hicks | May 4, 1948 |
| 2,495,640 | Muskat | Jan. 24, 1950 |

FOREIGN PATENTS

| | | |
|---|---|---|
| 555,680 | Great Britain | Sept. 2, 1943 |
| 555,690 | Great Britain | Sept. 2, 1943 |